United States Patent [19]

Modic

[11] 4,418,157

[45] Nov. 29, 1983

[54] LOW DENSITY SILICONE FOAM COMPOSITIONS AND METHOD FOR MAKING

[75] Inventor: Frank J. Modic, Scotia, N.Y.

[73] Assignee: General Electric Company, Waterford, N.Y.

[21] Appl. No.: 476,173

[22] Filed: Mar. 17, 1983

[51] Int. Cl.$^3$ .............................................. C08J 9/00
[52] U.S. Cl. ..................................... 521/82; 521/134; 521/154; 525/477; 528/10; 528/15; 528/31; 528/32
[58] Field of Search ...................... 528/10, 15, 31, 32; 525/477; 521/154, 134, 82

[56] References Cited

U.S. PATENT DOCUMENTS

| | | | |
|---|---|---|---|
| 3,730,931 | 5/1973 | Simoneou et al. .................... | 521/82 |
| 3,923,705 | 5/1977 | Smith ................................... | 521/154 |
| 4,026,845 | 5/1977 | Kim et al. ............................ | 521/154 |
| 4,189,545 | 2/1980 | Modic .................................. | 521/154 |
| 4,237,236 | 12/1980 | Newitski .............................. | 521/123 |

*Primary Examiner*—Morton Foelak
*Attorney, Agent, or Firm*—Gary L. Loser

[57] ABSTRACT

A method of reducing the density of a silicone foam is provided comprising mixing with a foamable silicone composition having a base polydiorganosiloxane, an effective amount of a resinous copolymer selected from the group consisting of resinous copolymers of $R_3SiO_{0.5}$ units and $SiO_2$ units, and ratio of $R_3SiO_{0.5}$ units ranging from 0.25 to 0.8:1, and resinous copolymers formed from $R_3SiO_{0.5}$ units, $R_2^1SiO$ units and $SiO_2$ units, the ratio of $R_3SiO_{0.5}$ to $SiO_2$ units ranging from 0.25 to 0.8:1 and the ratio of $R_2^1SiO$ to $SiO_2$ units ranging from 0 to 0.1:1, and thereafter simultaneously foaming and curing the mixture.

36 Claims, No Drawings

LOW DENSITY SILICONE FOAM COMPOSITIONS AND METHOD FOR MAKING

BACKGROUND OF THE INVENTION

The present invention relates to methods of making silicone foams having reduced density and foam compositions made thereby.

Silicone foams are known in the art and have been produced over a broad spectrum of densities, for example, as described in U.S. Pat. No. 3,070,555, U.S. Pat. No. 3,338,847, U.S. Pat. No. 3,425,967, U.S. Pat. No. 3,677,981, and U.S. Pat. No. 3,730,931.

A useful new class of foamable silicone compositions comprising a hydroxylated organosiloxane, an organohydrogensiloxane and a platinum catalyst is described by Smith, U.S. Pat. No. 3,923,705. Smith discloses that organosiloxane foams can be prepared by mixing an organohydrogensiloxane having an average of at least three silicon-bonded hydrogen atoms per molecule, an average of no more than one silicon-bonded hydrogen atom per silicon atom and organic radicals selected from the group consisting of alkyl radicals having from 1 to 6 carbon atoms per radical, phenyl and 3,3,3-trifluoropropyl radicals; a hydroxylated organosiloxane having an average of from greater than 1.0 to 2.5 silicon-bonded hydroxyl radicals per molecule and having an average of at least one organic radical per silicon atom selected from the group consisting of alkyl radicals having from 1 to 6 carbon atoms per radical, phenyl and 3,3,3-trifluoropropyl radicals; and a platinum catalyst in an amount of from 5 to 200 parts by weight platinum per one million parts by weight total composition, said organohydrogensiloxane and said hydroxylated organosiloxane being present in sufficient amounts to provide a molar ratio of silicon-bonded hydrogen atoms to silicon-bonded hydroxyl radicals of 2.5 to 40, where a mixture is obtained having a viscosity of less than 100,000 cs. at 25° C.

Lee and Ronk found that the foams of Smith were essentially closed-cell in structure, and in U.S. Pat. No. 4,026,842 disclosed that the open-cell structure could be increased by having present in the foamable composition an organomonohydrogensiloxane. Such organomonohydrogensiloxane has one silicon-bonded hydrogen atom per molecule and organic radicals selected from the group consisting of alkyl radicals having from 1 to 6 carbon atoms per radical, phenyl and 3,3,3-trifluoropropyl, said organomonohydrogensiloxane being present in an amount sufficient to provide a molar ratio of silicon-bonded hydrogen atoms from the organohydrogensiloxane to silicon-bonded hydrogen atoms from the organomonohydrogensiloxane of from 0.4 to 2:1 and the molar ratio of total silicon-bonded hydrogen atoms present in the mixture to silicon-bonded hydroxyl radicals remaining within the limits of 2.5 to 7:1.

It was disclosed by Modic in U.S. Pat. No. 4,189,545 that one disadvantage of compositions formed according to Smith is that good foams are not always produced unless an extremely active platinum complex catalyst is utilized. Modic overcame such shortcoming by including from 100 parts per million to 1.5 parts by weight of water as a blowing agent in a composition comprising 100 parts by weight of a vinyl-containing diorganopolysiloxane wherein the organo groups are selected from the class consisting of alkyl radicals of 1 to 8 carbon atoms, aryl radicals, vinyl radicals and fluoroalkyl radicals of 3 to 8 carbon atoms and such that the polymer contains from 0.0002 to 3 percent by weight vinyl radicals and the viscosity varies from 100 to 1,000,000 centipoise at 25° C.; 0 to 200 parts by weight of a filler; 1 to 50 parts by weight of a silicon hydride polymer wherein the organic radicals are selected from alkyl radicals of 1 to 8 carbon atoms, aryl radicals and fluoropropyl radicals of 3 to 8 carbon atoms, the hydrogen content varying from 0.3 to 1.6 percent by weight and the viscosity ranging from 5 to 100 centipoise at 25° C.; and from 1 to 250 parts per million of a platinum catalyst.

Those skilled in the art recognize that the viscosity of a foamable silicone composition impacts upon the density of the cured composition. That is, the higher the viscosity of the uncured composition, the lower the density of the resulting foam, or conversely, the lower the viscosity of the uncured composition, the higher the density of the resulting foam. Inasmuch as compositions having a lower viscosity are more easily mixed and dispensed than compositions of higher viscosity, it is desirable to provide methods for reducing the density of foamed low viscosity compositions.

One such method is provided by Kim, Lee and Ronk in U.S. Pat. No. 4,026,845, which describes a method for reducing the density of silicone foams of the type described by Smith in U.S. Pat. No. 3,923,705. Therein it is disclosed that mixing a fluorinated surfactant with a foamable silicone composition results in a cured foam having lower density than if the fluorinated surfactant had not been included. Increasing the amount of fluorinated surfactant further decreases the foam density. Thus, for example, by increasing the amount of fluorinated surfactant from 0.01 up to 10 parts by weight in a composition based on 100 parts by weight of polydiorganosiloxane, the result is that the cured foam has a lower density at 10 parts by weight than at 0.01 parts by weight of fluorinated surfactant.

Modic, in U.S. Pat. No. 3,424,967, discloses a silicone foam comprising, by weight, 100 parts of a vinyl chain-stopped diorganopolysiloxane of the formula

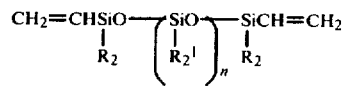

where R and $R^1$ are monovalent hydrocarbon radicals free of aliphatic unsaturation, with at least 50 mole percent of the $R^1$ groups being methyl, and n has a value of from about 50 to 2,000 inclusive; from 10 to 100 parts of an organopolysiloxane copolymer comprising $(R^2)_3SiO_{0.5}$ units and $SiO_2$ units and in which from about 2.5 to 10 mole percent of the silicon atoms contain silicon-bonded vinyl groups, where $R^2$ is selected from the class consisting of vinyl radicals and monovalent hydrocarbon radicals free of aliphatic unsaturation; from 10 to 100 parts of an inorganic fibrous material selected from the class consisting of asbestos and fibrous potassium titanate; from 0 to 50 parts of an inorganic filler; a platinum catalyst; an amount of a liquid organohydrogenpolysiloxane and from about 1 to 5 parts of a blowing agent. The skilled artisan will appreciate that the resinous copolymer of $(R^2)_3 SiO_{0.5}$ units and $SiO_2$ units is included as a reinforcing material or to impart additional strength to the final foam and not for regulating foam density.

In U.S. Pat. No. 3,730,931 Simoneau et al. disclose a composition which can be mechanically frothed with air to produce a foam comprising vinyl chloride polymer, a plasticizer and a silicone resin uniformly mixed with the polymer and plasticizer, such resin being selected from the class consisting of silicone resins having $R_3SiO_{0.5}$ monofunctional units and $SiO_2$ tetrafunctional units with the ratio of monofunctional units to tetrafunctional units ranging from 0.25 to 0.75:1 and silicone resins having $R_3^1SiO_{0.5}$ monofunctional units, $SiO_2$ tetrafunctional units and $R_2^2SiO$ difunctional units with the ratio of monofunctional units to tetrafunctional units being from 0.25 to 0.75:1 and the ratio of difunctional units to tetrafunctional units being from 0.05 to 0.1:1 where R, $R^1$ and $R^2$ are lower hydrocarbon monofunctional radicals. The composition preferably contains 20 to 40% vinyl chloride, 20 to 50% plasticizer and 1 to 8% silicone resin. To produce more efficient foaming the resins are further reacted such that they have a hydroxy content of less than about 0.5% by weight. Thus, the artisan will appreciate that an MQ resin is employed as a frothing or foaming agent in such a mechanical system because it is incompatible or insoluble in the base composition and not to reduce the density of the resulting foam.

Thus, it was highly surprising that resinous copolymers of $R_3SiO_{0.5}$ units and $SiO_2$ units or resinous copolymers of $R_3SiO_{0.5}$ units, $R_2^1SiO$ units and $SiO_2$ units could be utilized in the compositions of both Smith, U.S. Pat. No. 3,923,705, and Modic, U.S. Pat. No. 4,189,545 to reduce the density of the resulting foam.

Accordingly, it is an object of the present invention to provide a method of reducing the density of silicone foams.

It is also an object of the present invention to provide compositions which cure to foams and which have a resinous copolymer contained therein so that the cured foam has a lower density than those which do not contain such resinous copolymer.

Other objects and advantages of the present invention will be obvious from the following detailed description.

SUMMARY OF THE INVENTION

In accordance with the present invention, there is provided a method of reducing the density of silicone foams comprising mixing with a foamable silicone composition having a base polydiorganosiloxane, a resinous copolymer selected from the group consisting of copolymers comprising $R_3SiO_{0.5}$ units and $SiO_2$ units with the ratio of $R_3SiO_{0.5}$ (M) units to $SiO_2$ (Q) units being from about 0.25 to about 0.8:1, and copolymers comprising $R_3SiO_{0.5}$ units, $R_2^1$ SiO (D) units and $SiO_2$ units where the ratio of monofunctional units to tetrafunctional units is from about 0.25 to about 0.8:1 and the ratio of difunctional units to tetrafunctional units is from 0 to about 0.1:1, where R and $R^1$ are selected from the group consisting of alkyl radicals preferably having from 1 to 8 carbon atoms; aralkyl radicals, preferably having from 7 to 13 carbon atoms; alkaryl radicals, preferably having 7 to 13 carbon atoms; aryl radicals, preferably having from 6 to 8 carbon atoms; cycloalkyl radicals, preferably having from 6 to 8 carbon atoms; vinyl radical, allyl radical and fluoro radicals, preferably 3,3,3-trifluoropropyl.

The present invention further provides novel foam compositions made in accordance with the method of the invention.

DESCRIPTION OF THE INVENTION

In accordance with the present invention, silicone foams are prepared by mixing a polydiorganosiloxane base polymer, an organohydrogensiloxane and a resinous copolymer in the presence of a platinum catalyst, and thereafter foaming and curing the mixture to provide a silicone foam. Optional ingredients such as carbon black, filler and water may be included. The foams of the present invention can be used for cushioning, acoustical applications, and protective filling or coating applications and especially applications wherein fire retarding ability is important.

The polydiorganosiloxane base polymer is preferably either a silanol-containing organosiloxane of the type described by Smith, U.S. Pat. No. 3,923,705, or a vinyl containing polysiloxane of the type described by Modic, U.S. Pat. No. 4,189,545, both of which are incorporated by reference into the instant disclosure. Briefly, the hydroxylated organosiloxanes can be any organosiloxane mixture having an average of from greater than 1.0 to 2.5 silicon-bonded hydroxyl radicals per molecule. The organic radicals can be selected from the group consisting of alkyl radicals having from one to six carbon atoms per radical, phenyl and 3,3,3-trifluoropropyl. On average, there is at least one organic radical per silicon atom. The hydroxylated organosiloxanes can be homopolymers, copolymers or mixtures thereof. They can be mixtures of different molecular weight species and varying hydroxyl content so long as the average falls within the defined range. Examples of hydroxylated organosiloxanes are hydroxyl endblocked polydimethylsiloxane, hydroxyl endblocked polydiorganosiloxane having siloxane units of dimethylsiloxane and phenylmethylsiloxane, hydroxyl endblocked polymethyl 3,3,3-trifluoropropylsiloxane and hydroxyl endblocked polyorganosiloxane having siloxane units of monomethylsiloxane, dimethylsiloxane, monophenylsiloxane and diphenylsiloxane. Such hydroxylated organosiloxanes also include mixtures of hydroxylated organosiloxane polymers and hydroxylated organosiloxanes, such as a mixture of hydroxyl endblocked polydimethylsiloxane and diphenylmethylsilanol. As long as some hydroxylated organosiloxane polymer having two or more hydroxyl radicals per molecule is present, hydroxylated silanes can be used to provide from greater than 1.0 to 2.5 siliconbonded hydroxyl radicals per molecule.

The vinyl-containing polysiloxane base polymer has the general formula

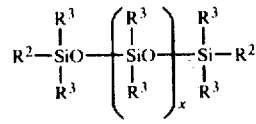

where $R^2$ and $R^3$ are selected from the class consisting of alkyl radicals of 1 to 8 carbon atoms, aryl radicals, vinyl radicals and fluoroalkyl radicals of 3 to 8 carbon atoms, there being present from 0.0002 to 3 percent by weight vinyl, and x varies such that the viscosity of the polymer is within the range of 100 to 1,000,000 centipoise at 25° C. Although a polymer having such a broad range of vinyl concentration will be effective, the preferred vinyl concentration is from 0.0002 to 0.1 percent by weight. This more limited vinyl concentration allows for a reaction which proceeds at a rate which is not too slow and yet is sufficiently rapid so as to provide proper crosslinking in the polymers to produce a cured silicone elastomeric foam. With respect to the viscosity range, it is preferred that the viscosity not be too high, otherwise the composition is difficult to handle and pour. Accordingly, preferred viscosities are on the order of 1,000 to 250,000 centipoise, and more preferably, from 2,500 to 100,000 centipoise at 25° C. Additionally, vinyl radicals are preferably bonded to terminal silicon atoms to provide a vinyl chain-stopped polysiloxane of the formula

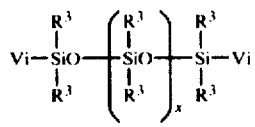

where Vi is a vinyl radical and $R^3$ is defined the same as hereinabove. Methods of making both silanol or vinyl containing polysiloxanes are well known to those skilled in the art.

The second ingredient required by both Smith (U.S. Pat. No. 3,923,705) and Modic (U.S. Pat. No. 4,189,545) is an organohydrogensiloxane. Smith discloses that the organohydrogensiloxane can be any siloxane having an average of at least three silicon-bonded hydrogen atoms per molecule and an average of no more than one silicon-bonded hydrogen atom per silicon atom. The remaining valences of the silicon atoms are satisfied by divalent oxygen atoms or by monovalent alkyl radicals having from 1 to 6 carbon atoms or by phenyl or trifluoropropyl radicals. The organohydrogensiloxanes can be homopolymers, copolymers or mixtures thereof which contain siloxane units of the following types:

$RSiO_{1.5}$, $R_2SiO$, $R_3SiO_{0.5}$,
$RHSiO$, $HSiO_{1.5}$, $R_2HSiO_{0.5}$,
$H_2SiO$, $RH_2SiO_{0.5}$ and $SiO_2$ where R is the same monovalent radical as defined above for the remaining valences of the silicon atoms. Preferably, the organohydrogensiloxanes have an average of at least five silicon-bonded hydrogen atoms per molecule.

Modic discloses that inasmuch as water is used as a blowing agent, the hydrogen content of the hydride polysiloxane polymer must range from 0.3 to 1.6% by weight and the viscosity from approximately 5 to 100 centipoise at 25° C. It is important that the hydrogen content limitation be met as too little hydrogen in the organohydrogensiloxane will not provide enough hydrogen to react with water to liberate hydrogen gas to effect foaming, nor will there be present sufficient hydrogen for crosslinking with the vinyl groups of the vinyl-containing polysiloxane. For further details the reader is referred to U.S. Pat. No. 4,189,545. With respect to the water content, Modic discloses that there be present from 100 parts per million to 1.5 parts by weight, and more preferably, from 500 to 15,000 parts per million water. Compositions containing this amount of water as a blowing agent foam without liberating too much or too little hydrogen. Accordingly, the ratio of organohydrogensiloxane to water should be from about 0.2 to 50:1.

The third ingredient required by both Smith and Modic is a platinum catalyst. Although Smith indicates that the catalyst can be in any of its known forms, Modic found that with such a system good foams were not produced unless an extremely active platinum complex catalyst was utilized. However, in Modic's silicone foam composition utilizing water as a blowing agent, a much broader spectrum of platinum catalysts was found to be effective. In any event, determining what platinum catalysts can be employed for a particular purpose is well within the ability of the skilled artisan without undue experimentation. For further details the reader is referred to the patents recited in both Smith and Modic.

The present invention is based on the surprising discovery that the density of silicone foam compositions can be reduced by mixing with a foamable silicone composition having a base polydiorganosiloxane, a resinous copolymer selected from the group consisting of copolymers comprising $R_3SiO_{0.5}$ units and $SiO_2$ units, the ratio of $R_3SiO_{0.5}$ units to $SiO_2$ units ranging from about 0.25 to about 0.8:1 and copolymers comprising $R_3SiO_{0.5}$ units, $R_2^1SiO$ units and $SiO_2$ units, the ratio of monofunctional $R_3SiO_{0.5}$ units to tetrafunctional $SiO_2$ units being from about 0.25 to about 0.8:1 and the ratio of difunctional $R_2^1SiO$ units to tetrafunctional units being from 0 to about 0.1:1. In the above formulas R and $R^1$ are selected from the group consisting of alkyl radicals, aryl radicals, aralkyl radicals, alkaryl radicals, cycloalkyl radicals, vinyl radical, allyl radical and fluoroalkyl radicals. Preferably the alkyl radicals have from 1 to 8 carbon atoms, the aralkyl radicals from 7 to 13 carbon atoms, the aryl radicals from 6 to 8 carbon atoms, the alkaryl radicals from 7 to 13 carbon atoms, the cycloalkyl radicals from 6 to 8 carbon atoms and preferably the fluoroalkyl radical is 3,3,3-trifluoropropyl. In one preferred embodiment R of the resin formed of monofunctional and tetrafunctional units is methyl so that the first resin has $(CH_3)_3SiO_{0.5}$ units and $SiO_2$ units. With the second resin, preferably R is methyl and $R^1$ is methyl and/or vinyl so that there is provided the following resins:

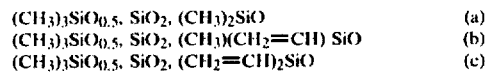

and various mixtures of the above resins.

In the most preferred embodiment of the MQ resin, the monofunctional groups have the formula

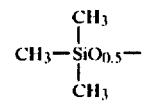

and in the most preferred embodiment of the MDQ resin the difunctional groups have the formula

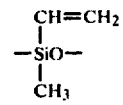

Of course, the preferred groups need not be bonded to each silicon atom so that there is greater flexibility in obtaining other desired properties.

Generally, for the first silicone resin the ratio of $R_3SiO_{0.5}$ units to $SiO_2$ units ranges from about 0.25 to about 0.8:1 and preferably 0.5 to 0.7:1. In the case of the second silicone resin (i.e. MDQ) the ratio of $R_3SiO_{0.5}$ units to SiO$_2$ units ranges from about 0.25 to about 0.8:1, preferably from about 0.5 to about 0.7, and the ratio of R$_2^1$ SiO units to SiO$_2$ units ranges from 0 to about 0.1:1, preferably from 0 to about 0.05.

The resins of the present invention are incorporated in an amount sufficient to reduce foam density to a desired level. Generally this will be anywhere from about 10 to about 50 parts by weight based on the weight of the base organopolysiloxane. It remains within the scope of the invention to utilize amounts of resin outside of this range; however, it is believed that such quantities will generally provide sufficient lowering of foam density.

The above resins are known in the art and may be prepared by any of several methods, for example, as described in Daudt et al., U.S. Pat. No. 2,676,182, Sauer, U.S. Pat. No. 2,398,672, Dexter, U.S. Pat. No. 2,736,721, and Goodwin, Jr., U.S. Pat. No. 2,857,356. Briefly, the Daudt et al. method discloses that the above resin may be prepared by reacting a silica hydrosol with compounds of the formula $$R_nSiX_{4-n} \text{ and } R_nSiO_{\frac{4-n}{2}} \text{ or}$$

with compounds of the formulas $R_n^1SiX_{4-n}$, $R_n^2SiX_{4-n}$ and $$R_n^1SiO_{\frac{4-n}{2}}.$$

The silica hydrosols employed are prepared in the usual manner by neutralizing sodium silicate solutions. This neutralization may be carried out either by employing an acid or a chlorosilane. In the latter case it is not necessary to add any additional acid to the reaction mixture. Whereas the silica sol at any concentration would react with the above-defined organosilicon compounds under acid conditions, it is preferred that the sol have a concentration of from 1 to 35 percent by weight SiO$_2$.

The silanes and siloxanes may be employed individually or in a mixture. In the case where alkoxysilanes are employed, it is necessary that the silica hydrosol contain sufficient acid so that the pH of the reaction mixture will be less than five. Suitable acids include hydrochloric, sulfuric, nitric and phosphorous acids. Any of a large group of compounds within the above formula may be used to prepare the silicone resin. Specific examples of individual compounds which are satisfactory are trimethylchlorosilane, trimethylethoxysilane, phenyldimethylchlorosilane, hexamethyldisiloxane, dimethylsiloxane, phenyltrichlorosilane, diethyltetramethyldisiloxane and methyltriethoxysilane.

The silica hydrosol is simply mixed with the silanes and/or siloxanes to form the required silicone resin. It has been found that the reaction between silica hydrosol, silanes and or siloxanes proceeds rapidly at 30° C. or above to produce the copolymeric siloxanes. During the reaction the mixture is thoroughly agitated. Following reaction, an emulsion forms which separates into two layers upon standing. The layers are then separated and the organosilicon layer washed free of acid with water. The organosilicon layer is then dried to yield the silicone resin product. Those interested in more specific details or other methods of resin preparation can refer to the above-identified patents.

Resinous copolymers of the type hereinabove described are useful for reducing the density of silicone foams in general, but preferably are used in the compositions of Smith, U.S. Pat. No. 3,923,705, and Modic, U.S. Pat. No. 4,189,545. Accordingly, one preferred composition of the present invention comprises an organohydrogensiloxane having an average of at least three silicon-bonded hydrogen atoms per molecule, an average of no more than one silicon-bonded hydrogen atom per silicon atom and organic radicals selected from the group consisting of alkyl radicals having from 1 to 6 carbon atoms per radical, phenyl and 3,3,3-trifluoropropyl; a hydroxylated organosiloxane having an average of at least one organic group per silicon atom selected from the group consisting of alkyl radicals having from 1 to 6 carbon atoms per radical, phenyl and 3,3,3-trifluoropropyl; a platinum catalyst in an amount of from 5 to 200 parts by weight platinum per one million parts by weight total composition; and from about 10 to 50 parts by weight of a resinous copolymer comprising R$_3$SiO$_{0.5}$ units and SiO$_2$ units or a resinous copolymer comprising R$_3$SiO$_{0.5}$ units, R$_2^1$SiO units and SiO$_2$ units, or mixtures thereof, wherein R and R$^1$ are as defined above, said organohydrogensiloxane and said hydroxylated organosiloxane being present in sufficient amounts to provide a molar ratio of silicon-bonded hydrogen atoms to silicon-bonded hydroxyl radicals of 2.5 to 40 and where a mixture is obtained having a viscosity of less than 100,000 centipoise at 25° C.

A second preferred composition comprises 100 parts by weight of a base vinyl-containing polymer of the formula

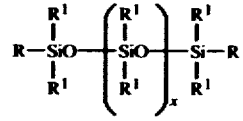

where R and R$^1$ are selected from the class consisting of alkyl radicals of 1 to 8 carbon atoms, aryl radicals, vinyl radicals and fluoroalkyl radicals of 3 to 8 carbon atoms such that the polymer contains from 0.0002 to 3% by weight vinyl and x varies such that the viscosity varies from 100 to 1,000,000 centipoise at 25° C.; from 100 to 15,000 parts per million by weight of water; from 1 to 50 parts by weight of a hydride polymer of the formula

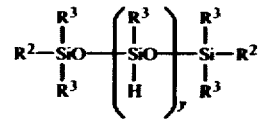

where R$^2$ is selected from the class consisting of hydrogen, alkyl radicals of 1 to 8 carbon atoms and aryl radicals and fluoroalkyl radicals of 3 to 8 carbon atoms and R$^3$ is selected from the class consisting of alkyl radicals and aryl radicals of up to 8 carbon atoms, where the hydride polymer has a hydrogen content varying from 0.3 to 1.6% by weight and y varies such that the polymer has a viscosity ranging from 5 to 100 centipoise at 25° C., where also there is at least 0.2 moles of the SiH per mole of water; from 1 to 250 parts per million of a platinum catalyst; and from about 10 to about 50 parts by weight of a resinous copolymer comprising R$_3$SiO$_{0.5}$ units and SiO$_2$ units, or a resinous copolymer comprising R$_3$SiO$_{0.5}$ units, R$_2^1$SiO units and SiO$_2$ units, or mixtures thereof, where R and R[1] are as defined above.

Inasmuch as the present invention has as one of its objects reducing the density of silicone foams, it follows that preferably the viscosity of the mixture is less than 25,000 centipoise at 25° C. since such mixtures generally give more dense foams.

The compositions of the present invention may contain additional ingredients such as fillers, fire retardants and the like. Typically there is from 0 to 200 parts by weight filler, which may be either an extending or reinforcing filler. Extending fillers are preferred since reinforcing fillers such as fumed silica and precipitated silica unduly increase the viscosity of the composition. Of the extending fillers, ground quartz has been found to be most suitable; however, other extending fillers such as titanium dioxide, zinc oxide, zirconium silicate, silica aerogel, iron oxide, diatomaceous earth, caclium carbonate magnesium oxide, calcined clay, carbon, and graphite are also effective.

The foams of the present invention may have fire retardant properties as prepared, but nevertheless, it may be useful to further improve the compositions' fire retardant property. The fire retardant properties of the foams can be increased without adding ingredients which give off toxic vapor when burned By adding to the ingredients to be mixed to make a foam from 0.01 to 10 parts by weight carbon black based on the total weight of the composition, preferably from 0.05 to 2 parts by weight, the fire retardant property of the foam is increased.

The method of the present invention involves mixing the ingredients and thereafter allowing the mixture to simultaneously foam and cure. The required ingredients can be mixed in any order and, additionally, the optional ingredients can be mixed with one or more of the required ingredients in any manner desired so long as premature reaction does not take place before all the ingredients are in the mixture. For purposes of storage, the organohydrogensiloxane and the platinum catalyst should not be stored as a mixture because gassing can occur.

To control the foaming and curing reactions which are taking place simultaneously, a catalyst inhibitor such as polymethylvinylsiloxane cyclic compounds and acetylenic alcohols can be added. Such inhibitors are known in the art and many varieties are available. The mixture of ingredients should be placed where they are to be used as soon as they are mixed because foaming begins immediately unless an inhibitor is used to extend the pot life such that the ingredients can be mixed and then put in the desired place of use. The method of the present invention thus provides siloxane foams which are obtained at room temperature, and as a result of adding a resinous copolymer there is obtained a silicone foam having a lower density than if the resin had been excluded.

The method of reducing the density of a silicone foam is advantageous because variations in foam density can be obtained simply by altering the amount of resin included in the foamable composition. Thus, to increase the density of the foam the amount of resin added to the foamable composition is reduced. Conversely, to reduce the density of the foam the amount of resin added to the foamable composition is increased. Moreover, the amount of raw materials stored by a user can be reduced since the densities can be changed at will during a single day on the assembly line without concern for having to clean equipment or alter the process.

The resulting foams can be used for cushioning, insulation, sealing and the like. Foams which contain platinum, particularly platinum and small amounts of carbon black, will be flame retardant and thus have added advantages in places where people or valuables are present. In such platinum-containing foams, the resinous copolymers of the present invention can be used without sacrificing the flame retardant property of the foam.

The following examples are presented for illustrative purposes only and should not be construed as limiting the present invention which is delineated in the claims.

EXAMPLE 1

There was formed a Composition A by combining 167 parts by weight of a vinyl terminated dimethylpolysiloxane polymer having a viscosity of 3500 centipoise at 25° C. and 0.0014% by weight vinyl content; 100 parts by weight of 5 micron silica filler; 30 parts platinum catalyst per million parts by weight polyorganosiloxane polymer, said catalyst being of the type described in U.S. Pat. No. 3,775,452 to Karstedt; and 400 parts 1,3,5,7-tetramethyl-1,3,5,7-tetravinylcyclotetrasiloxane per million parts by weight total composition. To 50 grams of Composition A which had a viscosity of about 8100 centipoise at 25° C., there was added 8 drops (0.15 grams) of water and 3.3 grams of a hydrogen-containing siloxane having a viscosity of approximately 20 centipoise at 25° C. and about 1.5% by weight hydrogen.

After mixing for approximately 30 seconds the catalyzed mixture began to foam and started to gel. Expansion of the foam was completed within two minutes and curing completed after about thirty minutes. The cured foam was found to have a density of 29.5 pounds per cubic foot. This example shows a silicone foam made in accordance with U.S. Pat. No. 4,189,545 to Modic.

EXAMPLE 2

There was formed a Composition B by combining 75 parts by weight of a vinyl terminated dimethylpolysiloxane polymer having a viscosity of 3500 centipoise at 25° C. and 0.0014 percent by weight vinyl content with 25 parts by weight of an organopolysiloxane copolymer comprising trimethyl siloxane units, methylvinyl siloxane units and $SiO_2$ units; 40 parts by weight of 5 micron silica filler and 30 parts platinum catalyst, as in Example 1, per million parts by weight polysilicone polymer. To 50 grams of Composition B, which had a viscosity of 7600 centipoise at 25° C., there was added 0.15 grams of water and 3.3 grams of organohydrogen-siloxane of Example 1. After mixing for about 30 seconds the catalyzed mixture began to foam and started to gel. After 30 minutes the resulting foam composition was found to have a density of 18.7 pounds per cubic foot.

EXAMPLE 3

There was formed a Composition C by combining 100 parts by weight of a silanol terminated dimethylpolysiloxane polymer having a viscosity of 2900 centipoise at 25° C. with 50 parts of a silanol terminated polymer having a viscosity of 160,000 centipoise at 25° C.; 50 parts of a 5 micron silica filler, and 20 parts platinum catalyst, as in Example 1, per million parts by weight polysilicone polymer. To 100 grams of Composition C there was added 6.6 grams of the organohydrogensiloxane of Example 1. After vigorous mixing for approximately 30 seconds, the catalyzed mixture began to foam and gel. The resulting foam was found to have a density of 25.7 pounds per cubic foot.

EXAMPLE 4

There was formed a Composition D by combining 65 parts by weight of a silanol-terminated dimethylpolysiloxane having a viscosity of 750 centipoise at 25° C. with 10 parts of an organopolysiloxane comprising trimethylsiloxane units and $SiO_2$ units; 12.5 parts by weight of a silanol-terminated dimethylsiloxane having a viscosity of 160,000 centipoise; 12.5 parts by weight of a 5 micron silica filler; and 20 parts platinum catalyst, as in Example 1, per million parts polysiloxane base polymer. To 100 grams of Composition D there was added 6.6 grams of the organohydrogensiloxane of Example 1. After mixing vigorously for approximately 30 seconds, the catalyzed mixture began to foam and gel. The density of the resulting foam was 20.2 pounds per cubic foot.

I claim:

1. A method of preparing a silicone foam of reduced density comprising mixing with a foamable silicone composition having a polydiorganosiloxane base polymer, an organohydrogen siloxane and a platinum catalyst, an amount of a resinous copolymer effective for reducing the density of the foam, said copolymer being selected from the group consisting of copolymers comprising $R_3SiO_{0.5}$ units and $SiO_2$ units, the ratio of $R_3SiO_{0.5}$ units to $SiO_2$ units ranging from about 0.25 to about 0.8:1, and copolymers comprising $R_3SiO_{0.5}$ units, $R_2{}^1SiO$ units and $SiO_2$ units, where the ratio of monofunctional units to tetrafunctional units is from about 0.25 to about 0.8:1 and the ratio of difunctional units to tetrafunctional units is from 0 to about 0.1:1, where R and $R^1$ are selected from the group consisting of alkyl radicals, aryl radicals, aralkyl radicals, alkaryl radicals, cycloalkyl radicals, vinyl radical, allyl radical and fluoroalkyl radicals and allowing the foamable composition to simultaneously foam and cure.

2. The method of claim 1 wherein the polydiorganosiloxane base polymer is a hydroxylated organosiloxane having an average of from greater than 1.0 to 2.5 silicon-bonded hydroxyl radicals per molecule and having an average of at least one organic radical per silicon atom selected from the group consisting of alkyl radicals having from 1 to 6 carbon atoms per radical, phenyl and 3,3,3-trifluoropropyl radicals.

3. The method of claim 1 wherein the polydiorganosiloxane base polymer is a vinyl-containing organosiloxane and wherein the organo groups are selected from the class consisting of alkyl radicals of 1 to 8 carbon atoms, aryl radicals, vinyl radicals and fluoroalkyl radicals of 3 to 8 carbon atoms, and such that the polymer contains from 0.0002 to 3% by weight vinyl and has a viscosity ranging from 100 to 1,000,000 centipoise at 25° C.

4. The method of claim 1 wherein the resinous copolymer is selected from the group consisting of copolymers comprising $(CH_3)_3SiO_{0.5}$ and $SiO_2$ units; $(CH_3)_3SiO_{0.5}$, $SiO_2$ and $(CH_3)_2SiO$ units; $(CH_3)_3SiO_{0.5}$, $SiO_2$ and $(CH_3)(CH_2=CH)SiO$ units; and $(CH_3)_3SiO_{0.5}$, $SiO_2$ and $(CH_2=CH)_2SiO$ units and mixtures thereof.

5. The method of claim 1 wherein the monofunctional uunits have the formula

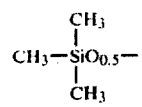

and the difunctional units have the formula

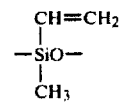

6. A method of preparing a silicone foam of reduced density comprising mixing an organohydrogensiloxane having an average of at least three silicon-bonded hydrogen atoms per molecule, an average of no more than 1 silicon-bonded hydrogen atom per silicon atom and organic radicals selected from the group consisting of alkyl radicals having from 1 to 6 carbon atoms per radical, phenyl and 3,3,3-trifluoropropyl; a hydroxylated organosiloxane having an average of from greater than 1.0 to 2.5 silicon-bonded hydroxyl radicals per molecule and having an average of at least one organic radical per silicon atom selected from the group consisting of alkyl radicals having from 1 to 6 carbon atoms per radical, phenyl and 3,3,3-trifluoropropyl; a platinum catalyst in an amount of from 5 to 200 parts by weight platinum per one million parts by weight total composition; and a resinous copolymer selected from the group consisting of copolymers comprising $R_3SiO_{0.5}$ units and $SiO_2$ units, the ratio of $R_3SiO_{0.5}$ units to $SiO_2$ units being from about 0.25 to about 0.8:1 and copolymers comprising $R_3SiO_{0.5}$, $R_2{}^1SiO$ and $SiO_2$ units, the ratio of $R_3SiO_{0.5}$ units to $SiO_2$ units ranging from about 0.25 to 0.8:1 and the ratio of $R_2{}^1SiO$ units to $SiO_2$ units ranging from 0 to about 0:1:1; said organohydrogensiloxane and said hydroxylated organosiloxane being present in sufficient amounts to provide a molar ratio of silicon-bonded hydrogen atoms to silicon-bonded hydroxyl radicals of 2.5 to 40:1, where R and $R^1$ are selected from the group consisting of alkyl radicals, aryl radicals, aralkyl radicals, alkaryl radicals, cycloalkyl radicals, vinyl radical, allyl radical and fluoroalkyl radicals, and where a mixture is obtained having a viscosity of less than 100,000 cs. at 25° C.; and thereafter allowing the mixture is simultaneously foam and cure.

7. A method of preparing silicone foam of reduced density comprising mixing (a) 100 parts by weight of a base vinyl-containing polymer of the formula:

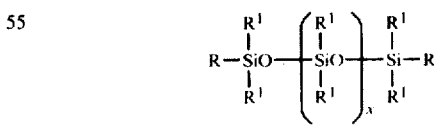

where R and $R^1$ are selected from the group consisting of alkyl radicals of 1 to 8 carbon atoms, aryl radicals, vinyl radicals and fluoroalkyl radicals of 3 to 8 carbon atoms, such that the polymer contains from 0.0002 to 3% by weight vinyl and x varies such that the viscosity of the polymer ranges from 100 to 1,000,000 centipoise at 25° C.; (b) from 0 to 200 parts by weight of a filler; (c) from 100 to 15,000 parts per million by weight of water;

(d) from 1 to 50 parts by weight of a hydride polymer of the formula

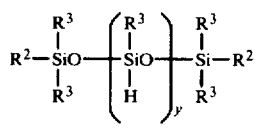

where $R^2$ is selected from the class consisting of hydrogen, alkyl radicals of 1 to 8 carbon atoms, aryl radicals and fluoroalkyl radicals of 3 to 8 carbon atoms, $R^3$ is selected from the class consisting of alkyl radicals and aryl radicals of up to 8 carbon atoms, where the hydride polymer has a hydrogen content varying from 5 to 100 centipoise at 25° C., and where there is also at least 0.2 moles of SiH per mole of water; (e) from 1 to 250 parts per million of a platinum catalyst; and (f) a resinous copolymer selected from the group consisting of copolymers comprising $R_3SiO_{0.5}$ units and $SiO_2$ units, the ratio of $R_3SiO_{0.5}$ units to $SiO_2$ units being from about 0.25 to about 0.8::1 and copolymers comprising $R_3SiO_{0.5}$ units, $R_2^1SiO$ units and $SiO_2$ units, the ratio of $R_3SiO_{0.5}$ units to $SiO_2$ units ranging from about 0.25 to about 0.8:1 and the ratio of $R_2^1SiO$ units to $SiO_2$ units ranging from 0 to about 0.1::1, where R and $R^1$ are selected from the group consisting of alkyl radicals, aryl radicals, aralkyl radicals, alkaryl radicals, cycloalkyl radicals, vinyl radical, allyl radical and fluoroalkyl radicals and thereafter allowing the mixture to simultaneously foam and cure.

8. The method of claim 1 wherein there is present up to 200 parts by weight of a filler selected from the class consisting of reinforcing fillers and extending fillers.

9. The method of claim 6 wherein there is present up to 200 parts by weight of a filler selected from the class consisting of reinforcing fillers and extending fillers.

10. The method of claim 1 wherein there is present from 0.01 to 10 parts by weight of carbon black.

11. The method of claim 6 wherein there is present from 0.01 to 10 parts by weight of carbon black.

12. The method of claim 7 wherein there is present from 0.01 to 10 parts by weight of carbon black.

13. The method of claim 1 wherein there is present a catalyst inhibitor selected from the group consisting of polymethylvinylsiloxane cyclic compounds and acetylenic alcohols.

14. The method of claim 6 wherein there is present a catalyst inhibitor selected from the group consisting of polymethylvinylsiloxane cyclic compounds and acetylenic alcohols.

15. The method of claim 7 wherein there is present a catalyst inhibitor selected from the group consisting of polymethylvinylsiloxane cyclic compounds and acetylenic alcohols.

16. The method of claim 1 wherein the viscosity of the mixture is less than 25,000 centipoise at 25° C.

17. The method of claim 6 wherein the viscosity of the mixture is less than 25,000 centipoise at 25° C.

18. The method of claim 7, wherein the viscosity of the mixture is less than 25,000 centipoise at 25° C.

19. A silicone foam composition comprising:
(a) a polydiorganosiloxane base polymer,
(b) an organohydrogensiloxane,
(c) a platinum catalyst, and
(d) an amount of a resinous copolymer effective for reducing the density of said foam selected from the group consisting of copolymers comprising $R_3SiO_{0.5}$ units and $SiO_2$ units, the ratio of $R_3SiO_{0.5}$ units to $SiO_2$ units being from about) 0.25 to about 0.8:1, and copolymers comprising $R_3SiO_{0.5}$ units $R_2^1SiO$ units and $SiO_2$ units where the ratio of monofunctional units to tetrafunctional units is from about 0.25 to about 0.8:1 and the rate of difunctional units, to $SiO_2$ units ranging from 0 to about 0.1:1, where R and $R^1$ are selected from the group consisting of alkyl radicals, aryl radicals, aralkyl radicals, vinyl radical, allyl radical and fluoroalkyl radicals.

20. The composition of claim 19 wherein the polydiorganosiloxane base polymer is a hydroxylated organosiloxane having an average of from greater than 1.0 to 2.5 siliconbonded hydroxyl radicals per molecule and having an average of at least one organic radical per silicon atom selected from the group consisting of alkyl radicals having from 1 to 6 carbon atoms per radical, phenyl and 3,3,3-trifluoropropyl radicals.

21. The composition of claim 19 wherein the polydiorganosiloxane base polymer is a vinyl-containing organosiloxane and wherein the organo groups are selected from the class consisting of alkyl radicals of 1 to 8 carbon atoms, aryl radicals, vinyl radicals and fluoroalkyl radicals of 3 to 8 carbon atoms and such that the polymer contains from 0.0002 to 3% by weight vinyl and has a viscosity ranging from 100 to 1,000,000 centipoise at 25° C.

22. The composition of claim 19 wherein the resinous copolymer is selected from the group consisting of copolymers comprising $(CH_3)_3SiO_{0.5}$ and $SiO_2$ units; $(CH_3)_3SiO_{0.5}$, $SiO_2$ and $(CH_3)_2SiO$ units; $(CH_3)_3SiO_{0.5}$, $SiO_2$ and $(CH_3)$ $(CH_2=CH)SiO$ units; and $(CH_3)_3SiO_{0.5}$, $SiO_2$ and $(CH_2=CH)_2SiO$ units and mixtures thereof.

23. The composition of claim 19 wherein the monofunctional units have the formula

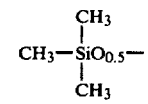

and the difunctional units have the formula

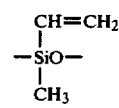

24. A silicone foam composition comprising:
(a) an organohydrogen siloxane having an average of at least three silicon-bonded hydrogen atoms per molecule, an average of no more than 1 silicon-bonded hydrogen atom per molecule, an average of no more than 1 silicon-bonded hydrogen atom per silicon atom and inorganic radicals selected from the group consisting of alkyl radicals having from 1 to 6 carbon atoms per radical, phenyl and 3,3,3-trifluoropropyl;
(b) a hydroxylated organosiloxane having an average of from greater than 1.0 to 2.5 silicon-bonded hydroxyl radicals per molecule and having an average of at least one organic radical per silicon atom selected from the group consisting of alkyl radicals having from 1 to 6 carbon atoms per radical, phenyl and 3,3,3-trifluoropropyl;

(c) a platinum catalyst in an amount of from 5 to 200 parts by weight platinum per one million parts by weight total composition; and (d) a resinous copolymer selected from the group consisting of copolymers comprising $R_3SiO_{0.5}$ units and $SiO_2$ units, the ratio of $R_3SiO_{0.5}$ units to $SiO_2$ units being from about 0.25 to 0.8:1 and copolymers comprising $R_3SiO_{0.5}$ units, $R_2^1SiO$ units and $SiO_2$ units, the ratio of $R_3SiO_{0.5}$ units to $SiO_2$ units ranging from 0.25 to 0.8:1 and the ratio of $R_2^1SiO$ units to $SiO_2$ units ranging from 0 to about 0.1:1; said organohydrogensiloxane and said hydroxylated organosiloxane being present in sufficient amounts to provide a molar ratio of silicon-bonded hydrogen atoms to silicon-bonded hydroxyl radicals of 2.5 to 40:1, where R and $R^1$ are selected from the group consisting of alkyl radicals, aryl radicals, aralkyl radicals, alkaryl radicals, cycloalkyl radicals, vinyl radical, allyl radical and fluoroalkyl radicals, and where the mixture of the ingredients had a viscosity of less than 100,000 cs. at 25° C.

25. A silicone foam composition comprising:

(a) 100 parts by weight of a base vinyl-containing polymer of the formula:

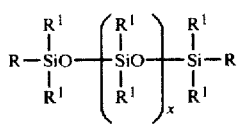

where R and $R^1$ are selected from the group consisting of alkyl radicals of 1 to 8 carbon atoms, aryl radicals, vinyl radicals and fluoroalkyl radicals of 3 to 8 carbon atoms, such that the polymer contains from 0.0002 to 3% by weight vinyl and x varies such that the viscosity of the polymer ranges from 100 to 1,000,000 centipoise at 25° C.;

(b) from 0 to 200 parts by weight of a filler;

(c) from 100 to 15,000 parts per million by weight of water;

(d) from 1 to 50 parts by weight of a hydride polymer of the formula:

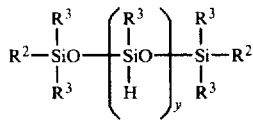

where $R^2$ is selected from the class consisting of hydrogen, alkyl radicals of 1 to 8 carbon atoms, aryl radicals and fluoroalkyl radicals of 3 to 8 carbon atoms, $R^3$ is selected from the class consisting of alkyl radicals and aryl radicals of up to 8 carbon atoms, where the hydride polymer has a hydrogen content varying from 0.3 to 1.6% by weight and y varies such that the polymer has a viscosity varying from 5 to 100 centipoise at 25° C., and where there is also at least 0.2 moles of SiH per mole of water;

(e) from 1 to 250 parts per million of a platinum catalyst; and (f) an amount of resinous copolymer effective for reducing the density of said silicone foam composition, said resinous copolymer being selected from the group consisting of copolymers comprising $R_3SiO_{0.5}$ units and $SiO_2$ units, the ratio of $R_3SiO_{0.5}$ units to $SiO_2$ units being from about 0.25 to about 0.8:1 and copolymers comprising $R_3SiO_{0.5}$ units, $R_2^1SiO$ units and $SiO_2$ units, the ratio of $R_3SiO_{0.5}$ units to $SiO_2$ units ranging from about 0.25 to about 0.8:1 and the ratio of $R_2^1SiO$ units to $SiO_2$ units ranging from 0 to about 0.1:1, where R and $R^1$ are selected from the group consisting of alkyl radicals, aryl radicals, aralkyl radicals, alkaryl radicals, cycloalkyl radicals, vinyl radical, allyl radical and fluoroalkyl radicals.

26. The composition of claim 19 wherein there is present up to 200 parts by weight of a filler selected from the class consisting of reinforcing fillers and extending fillers.

27. The composition of claim 24 wherein there is present up to 200 parts by weight of a filler selected from the class consisting of reinforcing fillers and extending fillers.

28. The composition of claim 19 wherein there is present from 0.01 to 10 parts by weight of carbon black.

29. The composition of claim 24 wherein there is present from 0.01 to 10 parts by weight of carbon black.

30. The composition of claim 25 wherein there is present from 0.01 to 10 parts by weight of carbon black.

31. The composition of claim 19 wherein there is present a catalyst inhibitor selected from the group consisting of polymethylvinylsiloxane cyclic compounds and acetylenic alcohols.

32. The composition of claim 24 wherein there is present a catalyst inhibitor selected from the group consisting of polymethylvinylsiloxane cyclic compounds and acetylenic alcohols.

33. The composition of claim 25 wherein there is present a catalyst inhibitor selected from the group consisting of polymethylvinylsiloxane cyclic compounds and acetylenic alcohols.

34. The composition of claim 19 wherein the silicone foam is formed from a mixture of ingredients having a viscosity less than 25,000 centipoise at 25° C.

35. The composition of claim 24 wherein the silicone foam is formed from a mixture of ingredients having a viscosity less than 25,000 centipoise at 25° C.

36. The composition of claim 25 wherein the silicone foam is formed from a mixture of ingredients having a viscosity less than 25,000 centipoise at 25° C.

* * * * *